Sept. 8, 1964     E. C. BRACE ETAL     3,148,130
RECOVERY OF COPPER SPONGE FROM OXIDIZED COPPER ORES
Filed May 12, 1961
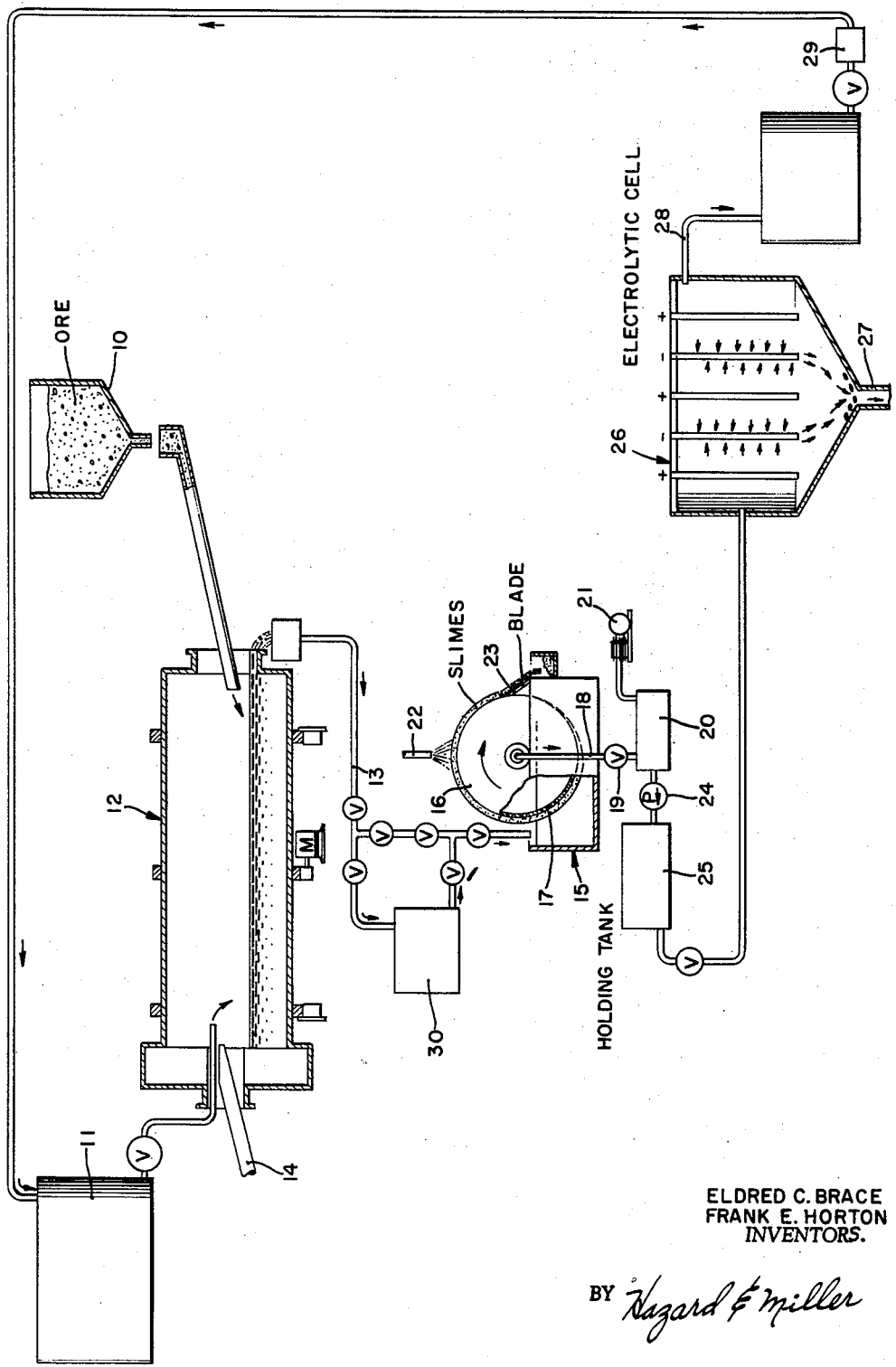
ELDRED C. BRACE
FRANK E. HORTON
INVENTORS.
BY *Hazard & Miller*
ATTORNEYS.

3,148,130
RECOVERY OF COPPER SPONGE FROM
OXIDIZED COPPER ORES
Eldred C. Brace and Frank E. Horton, Tucson, Ariz.,
assignors to Banner Mining Company, Tucson, Ariz.,
a corporation of Nevada
Filed May 12, 1961, Ser. No. 109,755
4 Claims. (Cl. 204—96)

This invention relates to a method and apparatus for recovering copper from oxidized copper ores, particularly those containing substantial amounts of calcium and/or magnesium carbonates which render the ores unsuitable for acid leaching. The invention may be considered as an improvement over the invention disclosed in United States Letters Patent No. 2,970,096, issued January 31, 1961, to Frank E. Horton.

In the above-mentioned patent there is disclosed a process and apparatus for treating oxidized copper ore, a typical sample of which is obtainable from the Mineral Hill Area, south of Tucson, Arizona. This and similar ores contain a substantial amount of chrysocolla, $CuSiO_3$, $2H_2O$ and minor amounts of azurite $Cu_3(CO_3)2(OH)_2$, malachite $CuCO_3Cu(OH)_2$, tenorite CuO, melaconite CuO and cuprite $Cu_2O$. These ores also contain as high as 20% of calcium and/or magnesium carbonates, and due to the presence of these carbonates an acid leach is unsuitable.

In the above-mentioned patent it is disclosed that such ores can be effectively leached with an alkaline leach preferably a 5 to 10 normal solution of sodium hydroxide. Sodium hydroxide is preferred to other alkaline leaches because of its availability and economy. As pointed out therein, it is usually necessary to agitate or scrub the ore during the leaching due to the fact that silica gels are formed primarily from the chrysocolla constituent of the ore and these gels unless removed by the agitation or scrubbing, resist continued penetration of the leach solution into the ore particles. These gels or slimes are picked up and are carried by the leach solution. It has been established that in the course of the leaching that sodium cuprate ($Na_2CuO_2$) is formed and that it is carried in the leach solution.

We have found that if the sodium cuprate and other copper-containing constituents carried by the alkaline leach solution are allowed to remain in contact with the silica gels or slimes that apparently an ion exchange takes place wherein copper-containing ingredients in the leach solution are adsorbed by the slimes. We have observed that when the pregnant alkaline solutions containing copper and also containing the slimes was re-circulated over the ores during the leaching period that the copper content of filtered samples of the leaching solution removed for assay purposes gradually decreased in copper content. To study this condition some of the slimes carried by the pregnant leach solution were removed and treated with a clarified sodium hydroxide solution containing sodium cuprate. The slimes were observed to have adsorbed the cuprate until an equilibrium of approximately 1.75% of copper was obtained in the slimes. The effluent solution from the slimes increased in sodium hydroxide content indicating that a form of ion exchange reaction was occurring between the sodium cuprate in the sodium hydroxide solution and the slimes. We also observed that as the slimes contained the mineral calcite which happened to be of fairly white color in its natural form, that the calcite present in the slimes turned a dark blue after treatment with the sodium cuprate solution. The blue color on the calcite ingredient of the slimes could not be removed by eluting the slimes with pure sodium hydroxide solution. It was, however, removable by eluting with a solution of sodium bicarbonate and the eluate showed the presence of copper.

One object of the present invention is to provide a method and apparatus for treating oxidized copper ores by means of an alkaline leach wherein the slimes are promptly and continuously removed from the pregnant leach solution. The adsorption of the copper in the pregnant leach solution by the slimes is apparently a function of time, and if the slimes are consequently promptly removed from the leach solution adsorption of copper by the slimes is avoided. Loss of copper extracted from the ore by the leach is consequently avoided.

Another object of the present invention is to provide a method for recovering copper from an alkaline leach solution. We have ascertained that if an alkaline leach solution containing sodium cuprate is subjected to electrolysis that during the electrolysis the sodium cuprate $Na_2CuO_2$ apparently breaks down into $Na_2O$ and CuO. The CuO ion becomes a cation (positively charged) and migrates to the cathode of the electrolytic cell. The hydrogen developed at the cathode and the oxygen developed at the anode eventually combine with the $Na_2O$ to form 2NaOH which can be used as fresh alkaline leach on additional ore. There is a partial reduction of the cuprate ($CuO_2$) down to CuO and when these ions contact the cathode the CuO settles from the cathode as copper sponge which can be periodically or continuously removed from the electrolytic cell and processed further.

It is undesirable to run pregnant alkaline leach solution containing slimes directly into the electrolytic cell. Not only will the slimes be apt to contain adsorbed copper ingredients, but such slimes in the electrolytic cell are apt to settle with the CuO or copper sponge, thus contaminating the sponge.

It is, therefore, another object of the invention to provide an improved method of recovering copper sponge from an alkaline leach solution containing sodium cuprate.

With the foregoing and other objects in view, which will be made manifest in the following detailed description and specifically pointed out in the appended claims, reference is had to the accompanying drawings for an illustrative embodiment of the invention, wherein:

The figure is a diagrammatic view of apparatus embodying the present invention illustrating the manner in which the method embodying the present invention can be performed.

In the drawing, 10 indicates an ore bin in which oxidized copper ores suitable for the treatment herein disclosed are supplied. These ores may be assumed to have been ground to suitable fineness so that they may be leached. 11 indicates a supply receptacle or reservoir which contains fresh alkaline leach preferably a water solution of sodium hydroxide.

The ore from the ore bin 10 and the leach from the reservoir or receptacle 11 are fed into the opposite ends of a rotary leach drum 12. This drum may be heated by a heating means, not shown, or the leach prior to being supplied to the drum may be heated by a heating means, not shown. While it is not essential to the present method or apparatus, we have found that if the leach during the leaching is heated to approximately 175° F. that the leaching is accomplished more rapidly than if the leaching operation is performed at ambient temperatures. It is also not essential to the present apparatus or method that the ore be supplied to the drum 12 and the leach supplied to the drum 12 pass therethrough counter-currently or in opposite directions. Such an arrangement is preferable however.

During the leaching, sodium cuprate ($Na_2CuO_2$) is formed and is carried by the leach solution to the outlet 13 from the drum. The leached ore particles are carried from the drum through the outlet 14. Silica gels or slimes are also produced and the continued rotation of the drum creates the agitation or scrubbing necessary to remove these gels from the ore particles to enable continued penetration of the leach solution into the ore particles. These gels or slimes are carried from the drum by the pregnant leach solution through the outlet 13.

As above explained, if the silica gels or slimes are allowed to remain in the pregnant leach solution an ion exchange apparently takes place between the pregnant leach solution and the slimes with copper-containing ingredients such as sodium cuprate being adsorbed by the slimes. To avoid this the pregnant leach solution containing the slimes or silica gels as delivered by the drum 12 is promptly conducted to a receptacle 15. Within this receptacle there is a rotary drum filter 16 having porous walls 17. The outlet from the rotary drum filter indicated at 18 has an automatic discharge valve 19 and leads to a receiver tank 20 to which is connected a vacuum pump 21. The vacuum generated by the vacuum pump is transmitted through the receiver tank to the interior of the drum causing flow of the leach solution inwardly through the porous walls 17 and causing the slimes or silica gels to be deposited or filtered out on the exterior of the porous walls. These slimes are washed with fresh water as indicated at 22 and may be continuously removed from the exterior of the drum by a blade or scraper 23.

From the receiver tank 20 a pump 24 pumps the filtered slime-free leach solution into a holding tank 25 from which it is conducted into an electrolytic cell 26 in which anodes and cathodes are suspended as indicated.

The values of the electric current found suitable for subjecting the pregnant leach solution to electrolysis are 5–10 amps. per square foot of cathode surface at 3–4 volts. In the electrolytic cell the probable electrochemical reactions are as follows:

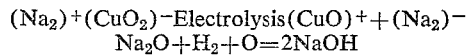

$$(Na_2)^+ + (CuO_2)^- \text{-Electrolysis} (CuO)^+ + (Na_2)^-$$
$$Na_2O + H_2 + O = 2NaOH$$

The CuO on contacting the cathode does not become plated thereon but settles by gravity to the bottom of the elecrolytic cell that is preferably conically shaped from which it can be removed as copper sponge through the outlet 27. In the electrolytic cell as observed from the above equations the $Na_2O$ combines with water or the hydrogen and oxygen developed at the cathode and anode respectively and forms sodium hydroxide which is removed through the outlet 28 and which may be returned such as by a pump 29 to the tank 11 and used as fresh leach.

We have observed that during electrolysis the copper sponge forms much heavier or in greater quantity on the electrodes at the upstream end of the electrolytic cell than on the electrodes near the outlet 23, indicating that the electrodes act in a physical way as baffles causing the separation of the copper sponge formed by the electroreduction reaction from the electrolyte.

In practice, the sodium hydroxide leach solution is fed into the drum 12 at the rate of approximately one gallon per pound of ore supplied to the drum. It is desirable to maintain the leach hot, or at approximately 175° F. It is also usually desirable to keep the leach solution hot in the filter container 15 and to wash the slimes with hot water at 18.

The slimes when removed still retain their ion exchange properties for cations, such as calcium and magnesium. Consequently, although the slimes are ordinarily discharged the washed slimes can be used to remove calcium and magnesium cations from hard water. Hard water containing as much as 2000 parts per million as hardness, after treatment by the slimes has a hardness of only about 50 parts per million.

The electrolyte that is delivered to the electrolytic cell 26 is ordinarily of a concentration of from 1–3 grams of copper per liter in the form of sodium cuprate. The copper sponge obtained through outlet 27 contains approximately 80% copper.

Tank 30 may be optionally included in the apparatus and serves merely as a standby tank to hold leach solution in the event that repairs or replacements are necessary in the filter or in the electrolytic cell.

Various changes may be made in the details of construction without departing from the spirit and scope of the invention as defined by the appended claims.

We claim:
1. The method of recovering copper from an alkaline solution containing sodium cuprate which consists of subjecting the solution to electrolysis at from 5 to 10 amps. per square foot of cathode surface at 3 to 4 volts whereby the $CuO_2$ radicals are reduced to CuO ions which are attracted to the cathode and are deposited at the cathode and fall therefrom by specific gravity as copper oxide sponge.

2. The method of recovering copper from a sodium hydroxide solution containing sodium cuprate which consists of subjecting the solution to electrolysis at from 5 to 10 amps. per square foot of cathode surface at 3 to 4 volts whereby the sodium cuprate breaks down into $Na_2O$ and CuO, the CuO migrates to the cathode and is deposited as copper sponge and the $Na_2O$ combines with water to form 2NaOH.

3. The method of recovering copper from oxidized copper ores which includes leaching the ore with a sodium hydroxide leach thus obtaining a solution containing sodium cuprate and slimes, removing the slimes from the solution, and subjecting the slime-free solution to electrolysis at from 5 to 10 amps. per square foot of cathode surface at 3 to 4 volts whereby the $Na_2CuO_2$ present in the solution breaks down into $Na_2O$ and CuO, the CuO migrates to the cathode and is deposited as copper sponge and the $Na_2O$ combines with the water to form 2NaOH and is returned for use as new leach on additional ore.

4. The method of recovering copper from oxidized copper ore which includes leaching the ore with an alkaline leach solution, continuously filtering the solution and removing the slimes therefrom prior to their adsorbing any substantial amounts of sodium cuprate, and subjecting the filtered slime-free solution to electrolysis at from 5 to 10 amps. per square foot of cathode surface at 3 to 4 volts whereby the sodium cuprate breaks down into sodium oxide and copper oxide with the copper oxide ions migrating to the cathode and being deposited therefrom as copper sponge and the sodium oxide combines with water to form 2NaOH and is returned to use on the ore as a new leach solution.

References Cited in the file of this patent

UNITED STATES PATENTS

| 748,609 | Hunt | Jan. 5, 1904 |
| 1,328,666 | Greenawalt | Jan. 20, 1920 |
| 1,654,930 | Greenawalt | Jan. 3, 1928 |
| 2,111,575 | Stack | Mar. 22, 1938 |
| 2,273,643 | Hurd | Feb. 17, 1942 |
| 2,970,096 | Horton | Jan. 31, 1961 |

OTHER REFERENCES

Rogers: "Handbook of Practical Electroplating," Macmillan Co., 1959, pages 136–161.